US008218588B1

(12) United States Patent
Bartholomew et al.

(10) Patent No.: US 8,218,588 B1
(45) Date of Patent: Jul. 10, 2012

(54) COMPACT EFFICIENT SEEDED MID-IR OPO OPA LASER

(75) Inventors: Jarett Levi Bartholomew, Victor, NY (US); Mark Steven Janosky, Rochester, NY (US)

(73) Assignee: Exelis, Inc., McLean, VA (US)

( * ) Notice: Subject to any disclaimer, the term of this patent is extended or adjusted under 35 U.S.C. 154(b) by 251 days.

(21) Appl. No.: 12/706,236

(22) Filed: Feb. 16, 2010

(51) Int. Cl.
*H01S 3/10* (2006.01)

(52) U.S. Cl. .............. 372/21; 372/18; 372/10; 372/41; 372/71; 372/75; 372/97; 372/105

(58) Field of Classification Search ............ 372/21, 372/18, 10, 41, 71, 75, 97, 105
See application file for complete search history.

(56) References Cited

U.S. PATENT DOCUMENTS

| 5,195,104 | A | | 3/1993 | Geiger et al. | |
|---|---|---|---|---|---|
| 6,130,900 | A | * | 10/2000 | Black et al. | 372/25 |
| 6,980,354 | B1 | * | 12/2005 | Smith et al. | 359/330 |
| 2006/0171429 | A1 | * | 8/2006 | Seitel | 372/10 |
| 2006/0209912 | A1 | * | 9/2006 | Luo et al. | 372/21 |

* cited by examiner

*Primary Examiner* — Kinam Park
(74) *Attorney, Agent, or Firm* — RatnerPrestia

(57) ABSTRACT

A diode-pumped solid state pulsed laser includes an intracavity nonlinear crystal for wavelength conversion by difference frequency mixing and a secondary resonant cavity containing an additional nonlinear crystal for parametric amplification. Primary and secondary cavities are capable of injection seeding and wavelength stabilization resulting in a very narrow, stable, and well defined spectral output. The combination of pump diode pulsing, the implementation of the intracavity parametric oscillator and parametric amplifier results in very efficient operation. Optical fiber coupled parametric oscillator byproduct light allows simple and non-invasive wavelength diagnostics and monitoring upon connection to an optical spectrum analyzer.

17 Claims, 2 Drawing Sheets

COMPACT EFFICIENT SEEDED MID-IR OPO OPA LASER

FIELD OF INVENTION

The present invention, in general, is directed to a mid-wave infrared (MWIR) optical laser system. More specifically, the present invention is directed to a system and method of generating a narrow wavelength mid-wave infrared (MWIR) laser signal using a combination of an optical parametric oscillator (OPO) and an optical parametric amplifier (OPA) intracavity configuration.

BACKGROUND OF THE INVENTION

Mid-wave infrared (MWIR) lasers are increasingly utilized in many fields, including remote sensing. More specifically, numerous chemical species detection systems, including differential absorption lidar (DIAL) systems, employ MWIR lasers as an active source.

Typical conventional MWIR lasers utilized in DIAL systems include a diode-pumped, solid-state, pulsed laser cavity which feeds an independent, non-linear crystal based optical parametric oscillator (OPO) and an optical parametric amplifier (OPA) cavity for wavelength conversion by difference frequency mixing. If the application system requires a very narrow, stable and well defined spectral output, these cavities may be injection seeded and phase locked. The result is a complex laser system that suffers from many deficiencies including: (a) a large number of components which results in a laser system that has a large volume, weight and power consumption; (b) large component costs; (c) poor long term performance; and (d) maintenance difficulties.

The present invention, however, provides a system and method for improved efficiency, compactness and ease of maintenance. As will be explained, the present invention uses a diode-pumped solid state laser with an intracavity non-linear OPO and OPA to provide wavelength conversion by difference frequency mixing.

SUMMARY OF THE INVENTION

To meet this and other needs, and in view of its purposes, the present invention provides a laser system including a first region formed by a first optical cavity for generating a first laser light, and a second region formed by a second optical cavity for generating a second laser light. Also included is an overlap region formed by the first and second regions for mixing the first and second laser light and generating a third laser light, wherein the third laser light is a desired primary output signal. The first region is larger than the second region, and a portion of the second region is located within the first region.

The overlap region includes a first nonlinear optical crystal (which may include an optical parametric oscillator (OPO)) for mixing the first and second laser light and generating the third laser light. The second region includes a second nonlinear optical crystal (which may include an optical parametric amplifier (OPA)) for amplifying the third laser light, prior to outputting the third laser light.

The first region receives a pump laser signal. The first region includes a rod resonating at a frequency of the first laser light, and the rod converts the received pump laser signal into the first laser light. The first region includes a Q-switch, which converts the first laser light into a pulsed first laser light. The overlap region includes an output port for individually outputting the first, second and third laser light for diagnostic purposes.

The first region may receive a first CW seed laser signal for spectrally locking and narrowing the first laser light. The second region may receive a second CW seed laser signal for spectrally locking and narrowing the second laser light. The third laser light may correspond to a spectral feature of a gas or vapor.

Another embodiment of the present invention is a mid-wave infrared (MWIR) laser system. The system includes a primary cavity and a secondary cavity, in which a portion of the secondary cavity overlaps into the primary cavity to form an overlapping region. The primary cavity resonates at a first wavelength and the secondary cavity resonates at a second wavelength. The overlapping region mixes the primary wavelength and the secondary wavelength and generates a third wavelength as a primary output signal. The overlapping region includes an optical parametric oscillator (OPO) for mixing the first wavelength light and second wavelength light and producing the third wavelength light, which varies between 2.8 um and 4.8 um. The secondary cavity includes an optical parametric amplifier (OPA) for converting the second wavelength light, which varies between 1.2 um and 1.6 um, into an additional third wavelength light. The primary cavity receives a pump laser signal, which is equal to or less than a 1.0 um wavelength. A 1.0 um rod is located in the primary cavity for converting the received pump laser signal into the first wavelength light of approximately 1.0 um.

A Q-switch is located in the primary cavity for converting the third wavelength light into a pulsed third wavelength light. The Q-switch includes driver electronics for controlling pulse width of the pulsed third wavelength light. A 1.0 um seed laser signal is received by the primary cavity for spectrally locking and narrowing the first wavelength light. A 1.5 um seed laser signal is received by the secondary cavity for spectrally locking and narrowing the second wavelength light. The overlapping region includes an output port for directing the first, second and third wavelengths of light to diagnostic equipment.

The first cavity is bounded by a high reflectance (HR) device at each end. The second cavity is also bounded by a high reflectance (HR) device at each end.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

The present invention will now be described by referring to elements shown in FIGS. 1 and 2. It will be understood that the elements shown or described may take other forms known to those skilled in the art.

The present invention provides a pulsed laser light output in the MWIR spectral region at a pulse repetition rate that may vary between 1 Hz and 100 kHz and a pulse width that may vary between 1 and 100 nanoseconds. The spectral line width of the light output is very narrow, measuring less than 1 GHz.

Figure 1:
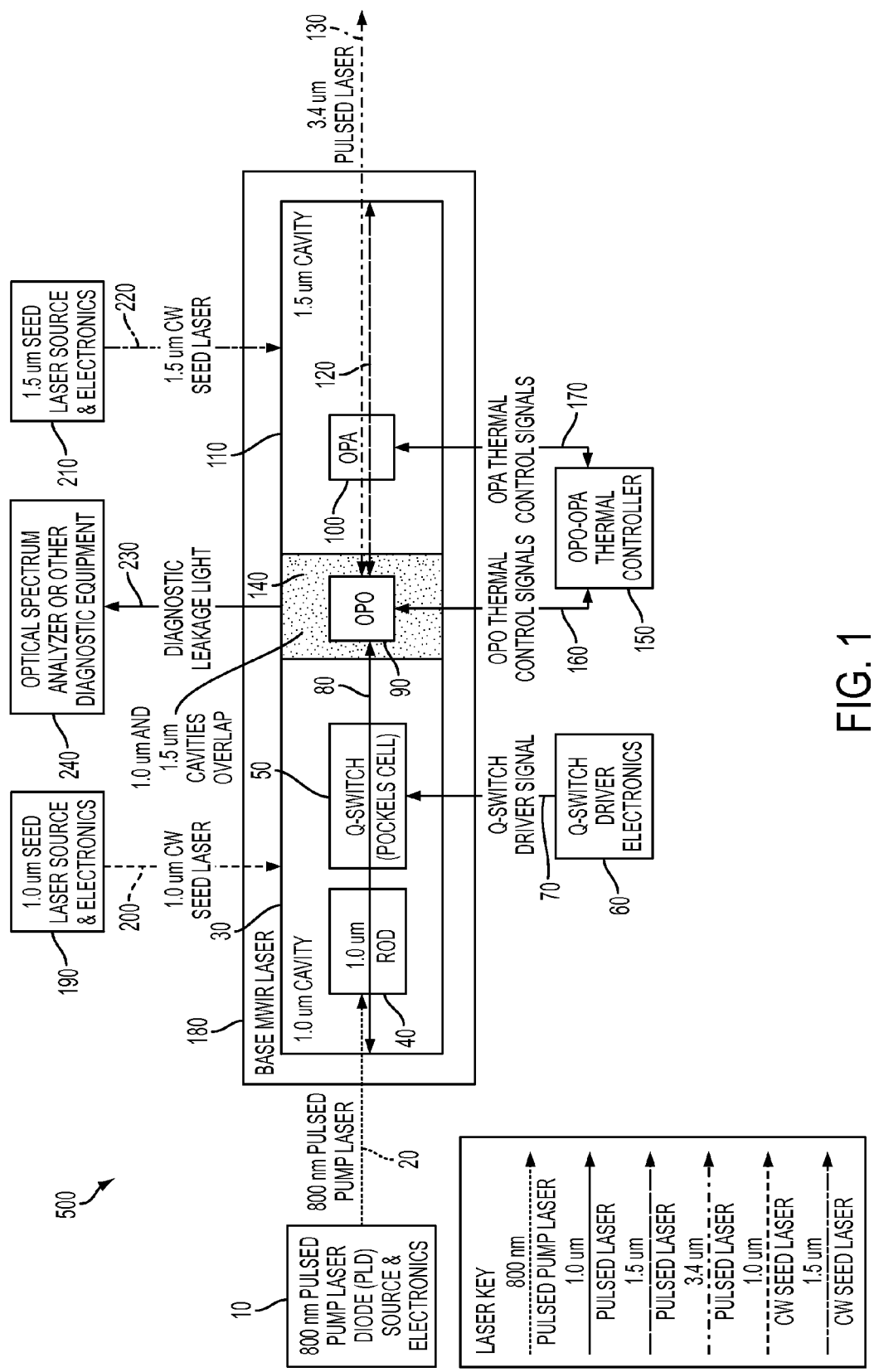
FIG. 1 is a block diagram of a compact, efficient, seeded, mid-wave infrared OPO/OPA laser system, in accordance with an embodiment of the present invention.

FIG. 1 is a block diagram of a laser system, in accordance with an embodiment of the present invention. As shown (and by way of example), laser system 500 generates a 3.4 um MWIR pulsed laser light 130. The laser system 500 includes a base MWIR laser subsystem, generally designated as 180, which is compact and efficient. The base MWIR laser subsystem 180 includes a 1.0 um cavity (also referred to herein as a primary cavity), designated as 30, and a 1.5 um cavity (also referred to herein as a secondary cavity), designated as 110. As shown, a portion of the 1.5 um cavity 110 is located inside the 1.0 um cavity 30, resulting in a 1.0 um and 1.5 um cavities overlap region, designated as 140. This overlap region 140 includes a first nonlinear optical crystal, such as an optical parametric oscillator (OPO) crystal, designated as 90. As will be explained, it is in this overlap region 140, also referred to herein as an intracavity, where the primary difference frequency mixing occurs.

Laser system 500 also includes a pulsed laser diode source, which provides a wavelength of 1.0 um or less (shown designated as 20). As an example, FIG. 1 shows an 800 nm pulsed laser diode source and electronics module, generally designated as 10, which produces an 800 nm pulsed pump laser light 20. The 800 nm pulsed pump laser light 20 is directed into the 1.0 um cavity 30. Within the 1.0 um cavity 30, a 1.0 um rod 40 and a Q-switch 50 are connected in series to convert the 800 nm pulsed pump laser light 20 into a 1.0 um pulsed laser light 80 (also referred to as a pump laser light). The Q-switch 50 is controlled by a Q-switch driver signal 70 generated by Q-switch driver electronics module 60.

The 1.0 um pulsed laser light 80 is pumped into the OPO crystal 90, the latter converting the 1.0 um pulsed laser light 80 into a 1.5 um pulsed laser light 120 and a 3.4 um pulsed laser light 130. The resulting 3.4 um pulsed laser light 130 is amplified by a second nonlinear optical crystal, for example an optical parametric amplifier (OPA) crystal 100, which consumes the excess 1.5 um pulsed laser light 120 within the 1.5 um cavity 110. The frequency mixing of the 1.0 um pulsed laser light 80 and the 1.5 um pulsed laser light 120 within the OPO crystal 90 results in the creation of an idler laser light and a 3.4 um pulsed laser light 130 (also referred to as an output laser light). This 3.4 um pulsed laser light 130 is the primary signal of the base MWIR laser subsystem 180. It will be appreciated that the primary signal of 3.4 um is exemplary only and may include other wavelengths, as will be explained below.

The OPO and the OPA provide the following crystal difference frequency mixing:

OPO: $1/\lambda_{output} = 1/\lambda_{pump} - 1/\lambda_{idler}$

OPA: $1/\lambda_{output} = 1/\lambda_{idler} - 1/\lambda_{dump}$ having the following wavelength definitions:

$\lambda_{pump}$: This wavelength is determined by the composition of the laser rod. If the rod is Nd:YAG, the wavelength is 1064 nm. If the rod is Nd:YLF, the wavelength is 1053 nm or 1047 nm, depending on rod crystal axis orientation.

$\lambda_{output}$: This wavelength may vary depending on the requirements of a specific application and may be anywhere in the range from 2.8 µm to 4.8 µm. In the example shown in FIG. 1, the wavelength output is 3.4 um.

$\lambda_{idler}$: This wavelength may also vary in the range of 1.2 µm to 1.6 µm and is determined by the crystal phase matching conditions of the OPO crystal that control the ratio between $\lambda_{idler}$ and $\lambda_{output}$. Those conditions include crystal temperature, angle of incidence, and polling period (when the crystal used is periodically polled lithium niobate).

$\lambda_{dump}$: This wavelength may also vary in the range of 1.6 µm to 3.8 µm and is determined by the crystal phase matching conditions of the OPA crystal that control the ratio between $\lambda_{idler}$ and $\lambda_{dump}$. Those conditions include crystal temperature, angle of incidence, and polling period (when the crystal used is periodically polled lithium niobate).

The phase matching conditions of the OPO and OPA crystals require that the difference frequency mixing equations, shown above, are satisfied simultaneously. The output wavelength ($\lambda_{output}$) of the laser may be tuned by simultaneous temperature and/or angle tuning of the OPO and OPA crystals (for example, using the OPO-OPA thermal controller 150 shown in FIG. 1)

In the embodiment illustrated in FIG. 1 (and FIG. 2), the following wavelengths are used:

$\lambda_{pump} = 1.0$ µm, $\lambda_{output} = 3.4$ µm, $\lambda_{idler} = 1.5$ µm, and $\lambda_{dump} = 2.7$ µm.

If frequency locking and narrowing of the primary 3.4 um pulsed laser light 130 is desired, additional components may be easily incorporated into laser system 500, as shown in FIG. 1. For example, the 1.0 um pulsed laser light 80 may be spectrally locked and narrowed using an injected 1.0 um continuous wave (CW) seed laser light, generally designated as 200. This CW seed laser light may be produced and controlled by a 1.0 um seed laser source and electronics module 190.

In addition, if desired, a similar locking and narrowing scheme may be used for the 1.5 um pulsed laser light 120 with a 1.5 um CW seed laser light 220, the latter produced and controlled by a 1.5 um seed laser source and electronics module 210.

Furthermore, the present invention offers a side benefit in that the 1.0 um and 1.5 um cavities overlap region 140 may produce diagnostic leakage light 230, as shown in FIG. 1. All the different laser signals may be analyzed using test equipment 240, such as an optical spectrum analyzer or other diagnostic equipment. It is unconventional to have all the different laser signals available at one location, but the present invention provides such an advantage.

Figure 2:
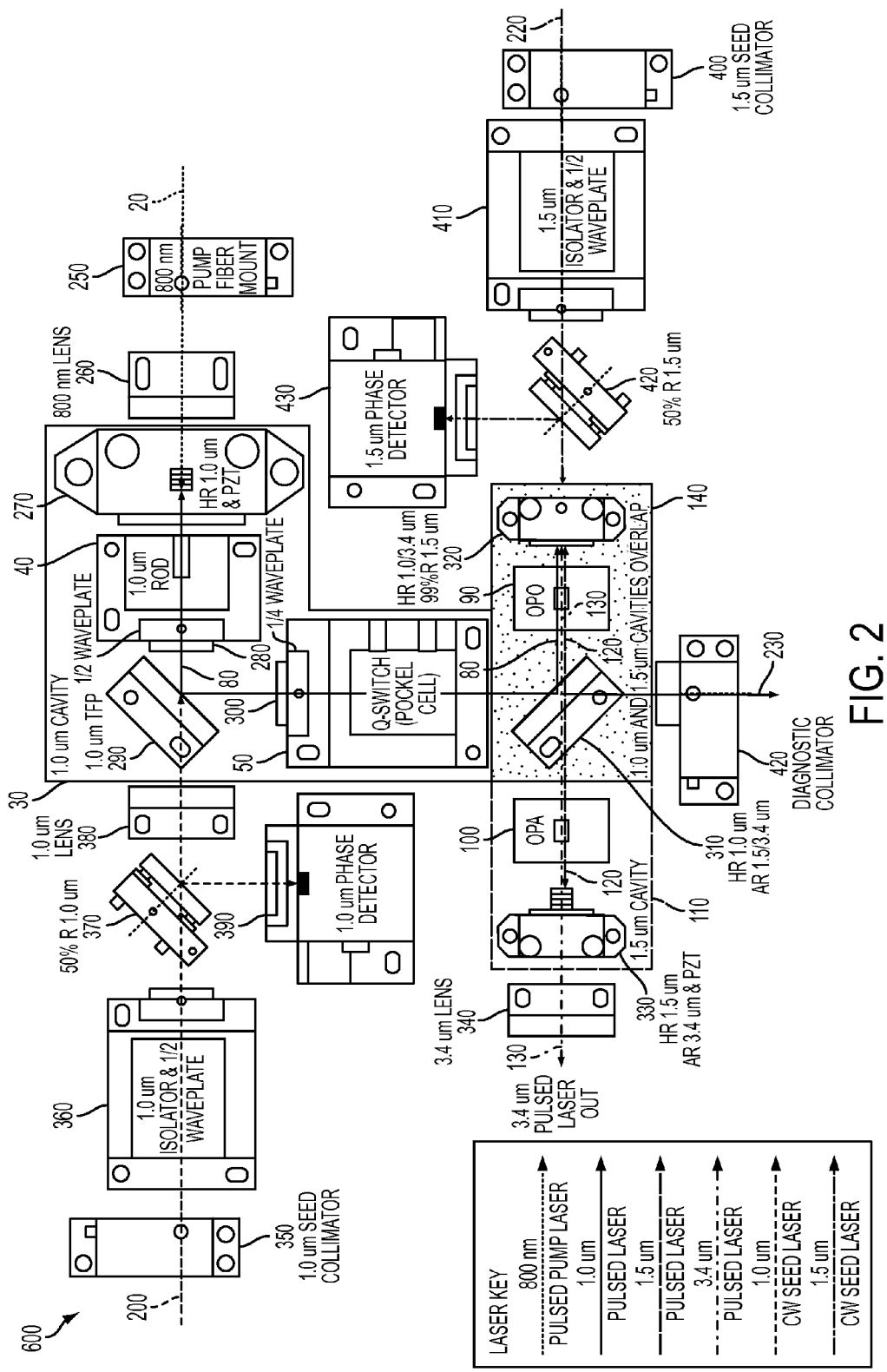
FIG. 2 is a mechanical schematic of an exemplary compact, efficient seeded, mid-wave infrared OPO/OPA laser system, in accordance with an embodiment of the present invention.

FIG. 2 is a mechanical drawing of an exemplary compact, efficient seeded, mid-wave infrared OPO/OPA laser system, generally designated as 600, in accordance with an embodiment of the present invention. As shown, the 800 nm pulsed pump laser light 20 is directed into an 800 nm pump fiber mount 250. The output from the 800 nm pump fiber mount 250 is a diverging version of the 800 nm pulsed pump laser light 20. The diverging light is then provided into an 800 nm lens 260, which again converges the 800 nm pulsed pump laser light 20.

This converging 800 nm pulsed pump laser light 20 now enters the 1.0 um cavity 30. The physical ends of this 1.0 um cavity are defined by (a) a high reflectance (HR) 1.0 um optic, piezoelectric actuator (PZT) and mount assembly 270 at one end of the cavity, and (b) an HR 1.0 um/3.4 um/99% reflectance (R) 1.5 um optic and mount assembly 320 at the other end of the cavity. Within this 1.0 um cavity 30, the 800 nm pulsed pump laser Light 20 is converted into a 1.0 um light by the 1.0 um rod 40 (which may, for example, include a Nd:YLF or Nd:YAG crystal). This 1.0 um light is then converted into a 1.0 um pulsed laser light 80 by using a Q-switch 50, in combination with a 1.0 um ½ waveplate 280 and a 1.0 um ¼ waveplate 300, as shown.

A 1.0 um thin film polarizer (TFP) 290 and an HR 1.0 um/anti-reflective (AR) 1.5 um/3.4 um optic and mount assembly 310 may also be included in this cavity, as shown and described later.

The 1.0 um pulsed laser light 80 becomes a new pump laser light which is directed into the OPO crystal 90 (which may, for example, include a periodically poled lithium niobate, or PPLN crystal). Within the OPO crystal 90, the 1.0 um pulsed laser light 80 is converted into a 1.5 um pulsed laser light 120, as shown. This 1.5 um pulsed laser light 120 resonates within the 1.5 um cavity 110, between (a) the HR 1.0 um/3.4 um/99% reflectance 1.5 um optic and mount assembly 320 at one end of the 1.5 um cavity and (b) the HR 1.5 um/AR 3.4 um optic and PZT mount assembly 330 at the other end of the 1.5 um cavity. Within this 1.5 um cavity 110, the 1.5 um light is converted into a 3.4 um light by the OPA crystal 100.

As shown, the 1.0 um cavity 30 and the 1.5 um cavity 110 share a unique overlapping portion that is also referred to herein as the 1.0 um and 1.5 um cavities overlap 140. It will be appreciated that the HR 1.0 um/anti-reflective (AR)1.5 um/3.4 um optic and mount assembly 310, which is disposed in the overlapping region, allows frequency mixing to occur within the OPO crystal 90. This is due to the fact that assembly 310 allows both the 1.0 um cavity 30 and the 1.5 um cavity 110 to resonate. The frequency mixing produces a 3.4 um pulsed laser light 130, which through appropriate coatings in the 1.5 um cavity 110 is allowed to exit as a primary output source of the base MWIR laser subsystem 180, shown in block diagram form in FIG. 1 and in mechanical form in FIG. 2.

It will be appreciated that if frequency locking and narrowing of the primary 3.4 um pulsed laser light 130 is desired, a few components may be easily employed. In FIG. 2, for example, the 1.0 um pulsed laser light 80 may be locked and narrowed using an injected 1.0 um CW seed laser light 200 (output from module 190 shown in FIG. 1). The 1.0 um CW seed laser light 200 is directed into a 1.0 um seed collimator 350, which then directs the 1.0 um CW seed laser light 200 into a combination 1.0 um isolator and ½ waveplate 360. This combination element 360 provides desired polarization and isolation functions. The 1.0 um CW seed laser light 200 is injected into the 1.0 um cavity 30 by way of a 1.0 um lens 380 followed by the 1.0 um TFP 290.

Also included in system 600 of FIG. 2 (if desired) is a 50% reflectance/1.0 um optic and mount assembly 370, which allows both leakage levels of the 1.0 um pulsed laser light 80 and the 1.0 um CW seed laser light 200 to be routed into a 1.0 um phase detector 390. The comparative phase of these two lights may then be measured. The electronics portion of the 1.0 um seed laser source and electronics module 190 (FIG. 1) may then be used to lock the phase of the two lights by using the PZT portion of the high reflectance (HR) 1.0 um optic, PZT and mount assembly 270.

A similar process, if desired, may be repeated for the 1.5 um pulsed laser light 120. In such case, as shown, the 1.5 um CW seed laser light 220 is directed into a 1.5 um seed collimator 400, which then directs the 1.5 CW seed laser light 220 into a combination 1.5 um isolator and ½ waveplate 410, the latter providing polarization and isolation functions. The 1.5 um CW seed laser light 220 is then injected into the 1.5 um cavity 110 by way of the HR 1.0 um/3.4 um/99% reflectance 1.5 um optic and mount assembly 320. Also present, as shown, is a 50% reflectance 1.5 um optic and mount assembly 420 which allows leakage levels of both the 1.5 um pulsed laser light 120 and the 1.5 um CW seed laser light 220 to be routed into a 1.5 um phase detector 430. The phase of the these two lights may then be measured, so that the electronics portion of the 1.5 um seed source and electronics module 210 (FIG. 1) may be used to lock the phase of the two lights by using the PZT portion of the HR 1.5 um/AR 3.4 um optic, PZT and mount assembly 330.

In addition, a side benefit of the present invention results from the 1.0 um and 1.5 um cavities overlap region 140 producing diagnostic leakage light 230 for all of the lasers. This leakage light may be analyzed using test equipment, such as an optical spectrum analyzer, or other diagnostic equipment 240 (FIG. 1). A diagnostic collimator 420 may be used, if desired, to collimate the diagnostic light beams prior to reaching the diagnostic equipment.

The following table provides an exemplary list of the parts that may be used in the system shown in FIGS. 1 and 2. Some of the parts are optional as described above.

| | |
|---|---|
| 10 | 800 nm Pulsed Pump Laser Diode Source & Electronics |
| 20 | 800 nm Pulsed Pump Laser Light |
| 30 | 1.0 um Cavity |
| 40 | 1.0 um Rod |
| 50 | Q-Switch (Pockels Cell) |
| 60 | Q-Switch Driver Electronics |
| 70 | Q-Switch Driver Signal |
| 80 | 1.0 um Pulsed Laser Light |
| 90 | Optical Parametric Oscillator (OPO) Nonlinear Crystal |
| 100 | Optical Parametric Amplifier (OPA) Nonlinear Crystal |
| 110 | 1.5 um Cavity |
| 120 | 1.5 um Pulsed Laser Light |
| 130 | 3.4 um Pulsed Laser Light |
| 140 | 1.0 um and 1.5 um Cavities Overlap |
| 150 | OPO-OPA Thermal Controller |
| 160 | OPO Thermal Control Signals |
| 170 | OPA Thermal Control Signals |
| 180 | Base MWIR Laser System |
| 190 | 1.0 um Seed Laser Source & Electronics |
| 200 | 1.0 um Seed Laser Light |
| 210 | 1.5 um Laser Seed Laser Source & Electronics |
| 220 | 1.5 um Seed Laser Light |
| 230 | Diagnostic Leakage Light |
| 240 | Optical Spectrum Analyzer or other Diagnostic Equipment |
| 250 | 800 nm Pump Fiber Mount |
| 260 | 800 nm Lens |
| 270 | High Reflectance (HR) 1.0 um Optic, Piezoelectric Actuator (PZT), & Mount Assembly |
| 280 | 1.0 um ½ Waveplate |
| 290 | 1.0 um Thin Film Polarizer (TFP) |
| 300 | 1.0 um ¼ Waveplate |
| 310 | HR 1.0 um, AR 1.5/3.4 um Optic & Mount Assembly |
| 320 | HR 1.0/3.4 um, 99% R 1.5 um Optic & Mount Assembly |
| 330 | HR 1.5 um, AR 3.4 um Optic, PZT & Mount Assembly |
| 340 | 3.4 um Lens |
| 350 | 1.0 um Seed Collimator |
| 360 | 1.0 um Isolator & ½ Waveplate |
| 370 | 50% R 1.0 um Optic and Mount Assembly |
| 380 | 1.0 um Lens |
| 390 | 1.0 um Phase Detector |
| 400 | 1.5 um Seed Collimator |
| 410 | 1.5 um Isolator & ½ Waveplate |
| 420 | 50% R 1.5 um Optic and Mount Assembly |
| 430 | 1.5 um Phase Detector |
| 440 | Diagnostic Collimator |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A laser system comprising:
a first region formed by a first optical cavity for generating a first laser light,
a second region formed by a second optical cavity for generating a second laser light, and
an overlap region formed by the first and second regions for mixing the first and second laser light and generating a third laser light,
wherein the third laser light is a desired primary output signal,
the overlap region includes a first nonlinear optical crystal for mixing the first and second laser light and generating the third laser light,
the second region includes a second nonlinear optical crystal for amplifying the third laser light, prior to outputting the third laser light,
the second nonlinear optical crystal is an optical parametric amplifier (OPA),
the OPA is disposed externally of the overlap region, and
the third laser light is provided as an output directly from the OPA in the second region.

2. The laser system of claim 1 wherein
the first region is larger than the second region, and
a portion of the second region is located within the first region.

3. The laser system of claim 1 wherein
the first region receives a pump laser signal, and
the first region includes a rod resonating at a frequency of the first laser light, and
the rod converts the received pump laser signal into the first laser light.

4. The laser system of claim 3 wherein
the first region includes a Q-switch, and
the Q-switch converts the first laser light into a pulsed first laser light.

5. The laser system of claim 1 wherein
the overlap region includes an output port for individually outputting the first, second and third laser light for diagnostic purposes.

6. The laser system of claim 1 wherein
the first region receives a first CW seed laser signal for spectrally locking and narrowing the first laser light.

7. The laser system of claim 1 wherein
the second region receives a second CW seed laser signal for spectrally locking and narrowing the second laser light.

8. The laser system of claim 1 wherein
the third laser light is configured to correspond to a spectral feature of a gas or vapor.

9. A mid-wave infrared (MWIR) laser system comprising:
a primary cavity and a secondary cavity, in which a portion of the secondary cavity overlaps into the primary cavity to form an overlapping region,
the primary cavity resonating at a first wavelength and the secondary cavity resonating at a second wavelength, and
the overlapping region mixing the primary wavelength and the secondary wavelength and generating a third wavelength as a primary output signal,
wherein the overlapping region includes an optical parametric oscillator (OPO) for mixing the first wavelength light and second wavelength light and producing the third wavelength light,
the secondary cavity includes an optical parametric amplifier (OPA) for converting the second wavelength light into an additional third wavelength light,
the OPA is external of the primary cavity, and
a feedback loop is provided between the OPA and OPO for generating the third wavelength directly from the OPA.

10. The MWIR laser system of claim 9 wherein
the primary cavity receives a pump laser signal, which is equal to or less than a 1.0 um wavelength, and
a 1.0 um rod is located in the primary cavity for converting the received pump laser signal into the first wavelength light of approximately 1.0 um.

11. The MWIR laser system of claim 10 wherein
a Q-switch is located in the primary cavity for converting the third wavelength light into a pulsed third wavelength light.

12. The MWIR laser system of claim 11 wherein
the Q-switch includes driver electronics for controlling pulse width of the pulsed third wavelength light.

13. The MWIR laser system of claim 9 wherein
a 1.0 um seed laser signal is received by the primary cavity for spectrally locking and narrowing the first wavelength light.

14. The MWIR laser system of claim 9 wherein
a 1.5 um seed laser signal is received by the secondary cavity for spectrally locking and narrowing the second wavelength light.

15. The MWIR laser system of claim 9 wherein
the overlapping region includes an output port for directing the first, second and third wavelengths of light to diagnostic equipment.

16. The MWIR laser system of claim 9 wherein
the first cavity is bounded by a high reflectance (HR) device at each end.

17. The MWIR laser system of claim 9 wherein
the second cavity is bounded by a high reflectance (HR) device at each end.

* * * * *